J. H. KATE.
EGG TESTER.
APPLICATION FILED SEPT. 21, 1916.

1,226,078. Patented May 15, 1917.

Witness
Will Freeman

Inventor
John H. Kate
by Oswin H Bair Attys.

UNITED STATES PATENT OFFICE.

JOHN H. KATE, OF DES MOINES, IOWA, ASSIGNOR, BY DIRECT AND MESNE ASSIGNMENTS, TO X RAY INCUBATOR COMPANY, OF DES MOINES, IOWA, A CORPORATION OF IOWA.

EGG-TESTER.

1,226,078.  Specification of Letters Patent.  Patented May 15, 1917.

Application filed September 21, 1916.  Serial No. 121,439.

*To all whom it may concern:*

Be it known that I, JOHN H. KATE, a citizen of the United States, and resident of Des Moines, in the county of Polk and State of Iowa, have invented a certain new and useful Egg-Tester, of which the following is a specification.

The object of my invention is to provide an egg tester of simple, durable and inexpensive construction which may be readily, quickly and easily placed in and supported by the flexible light excluding egg holder having an opening therein and connected to a metal lamp chimney in such a manner that the heat from the lamp is not directly applied to the egg and yet the light from the lamp will be projected through the egg so that the condition of germination of the egg may be readily viewed by the operator.

Figure 2:
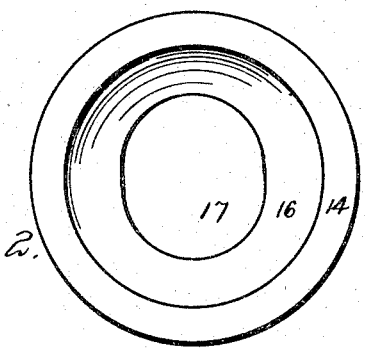
Figure 1:
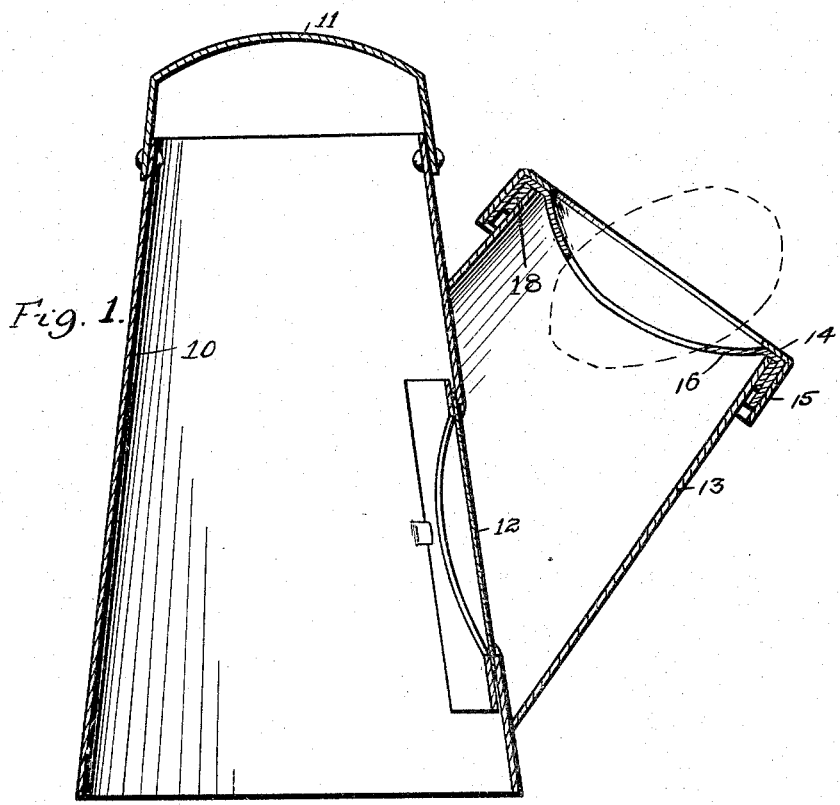

My invention consists in the construction, arrangement and combination of the various parts of the device, whereby the objects contemplated are attained, as hereinafter more fully set forth, pointed out in my claims, and illustrated in the accompanying drawings, in which:

Figure 1 shows a vertical, central, sectional view through an egg testing device embodying my invention. The dotted lines in said figure show an egg in position to be tested, and Fig. 2 shows a plan view of the part of the tester designed to receive and support an egg.

Referring to the accompanying drawings, I have used the reference numeral 10 to indicate a metal lamp chimney of ordinary construction provided at its top with a heat deflector 11 and also provided at one side with a transparent plate 12.

Formed on or fixed to one side of the chimney 11 is a metal cylinder 13 surrounding the transparent plate 12 and projected from the lamp chimney upwardly and outwardly and open at its upper end. I have provided a detachable cap for the cylinder 13, comprising a top portion 14 having a large central opening and side flanges 15. Within this cap is an egg holding member 16 preferably made of felt or some other flexible light excluding material. This egg holding member has an opening 17, preferably oval, in its central portion, of such size as to permit part of an egg to enter it and to hold and support an egg placed upon it. The central portion of this egg holding member 16 is bowed downwardly to form a pocket to receive and support an egg, and the edges of the flexible egg holder are clamped against the flanges 15 by means of a metal ring 18, which ring fits the exterior of the cylinder 13.

By adjusting the ring 13 within the flange 15, the flexible egg holder member may be bowed downwardly more or less, as desired.

In practical use the chimney 12 is placed upon an ordinary lamp and the lamp is placed in such position relative to the operator's eyes as will enable the operator to look down straight through the cylinder 13 toward the flame of the lamp. Then the operator grasps an egg in one hand and places it upon the flexible egg supporting member, preferably with the small end of the egg extending through the opening in said egg retainer. The operator does not need to hold the egg when viewing it, as the pocket-shaped egg retaining device is sufficient to hold it and the operator may view one egg while using his hands for grasping or replacing other eggs.

Another advantage aside from supporting the eggs while the operator is viewing them, is that the flexible pocket-shaped light excluding egg holder fits tightly around the egg and excludes rays of light from the lamp passing around the exterior of the egg, so that only the rays of light that pass through the egg strike the operator's eyes, thus providing a means by which eggs of all ordinary sizes and shapes may have the egg holder member adapted and fitted to them instantly and accurately. The feature by which the flexible egg holder member may be adjusted to incline downwardly more or less at its central portion, is of advantage for adapting the device for use in connection with eggs of greater or less size. For instance, when relatively large eggs are being examined, it is desirable to have the egg holder member bag downwardly more at its central portion to prevent the eggs from rolling off while being used.

I claim as my invention:

1. In an egg tester, the combination of a chimney portion, a cylinder supported on the chimney portion and extended outwardly and upwardly therefrom and open at its upper end, a cap for the cylinder, having a large central opening therein and fitted to the outer end of the cylinder, and a flexible light excluding egg retaining member contained within the cap and curved or bowed downwardly at its central portion and provided with a central opening to receive and support an egg.

2. An improved egg tester, comprising a metallic lamp chimney having a transparent portion in one side, a metallic cylinder surrounding said transparent portion and extending upwardly and outwardly therefrom and having its outer end inclined downwardly and outwardly from the chimney, a cap having a large central opening and flanges at its sides, a detachable rim on the interior of the cap, and a flexible light excluding egg retaining member between the flanges of the cap and the said ring, and provided with a central opening and curved or bowed downwardly at its central portion, the amount of such curvature being capable of adjustment by a manipulation of said ring, for the purposes stated.

Des Moines, Iowa, August 17, 1916.

JOHN H. KATE.

Copies of this patent may be obtained for five cents each, by addressing the "Commissioner of Patents, Washington, D. C."